United States Patent Office 3,296,938
Patented Jan. 10, 1967

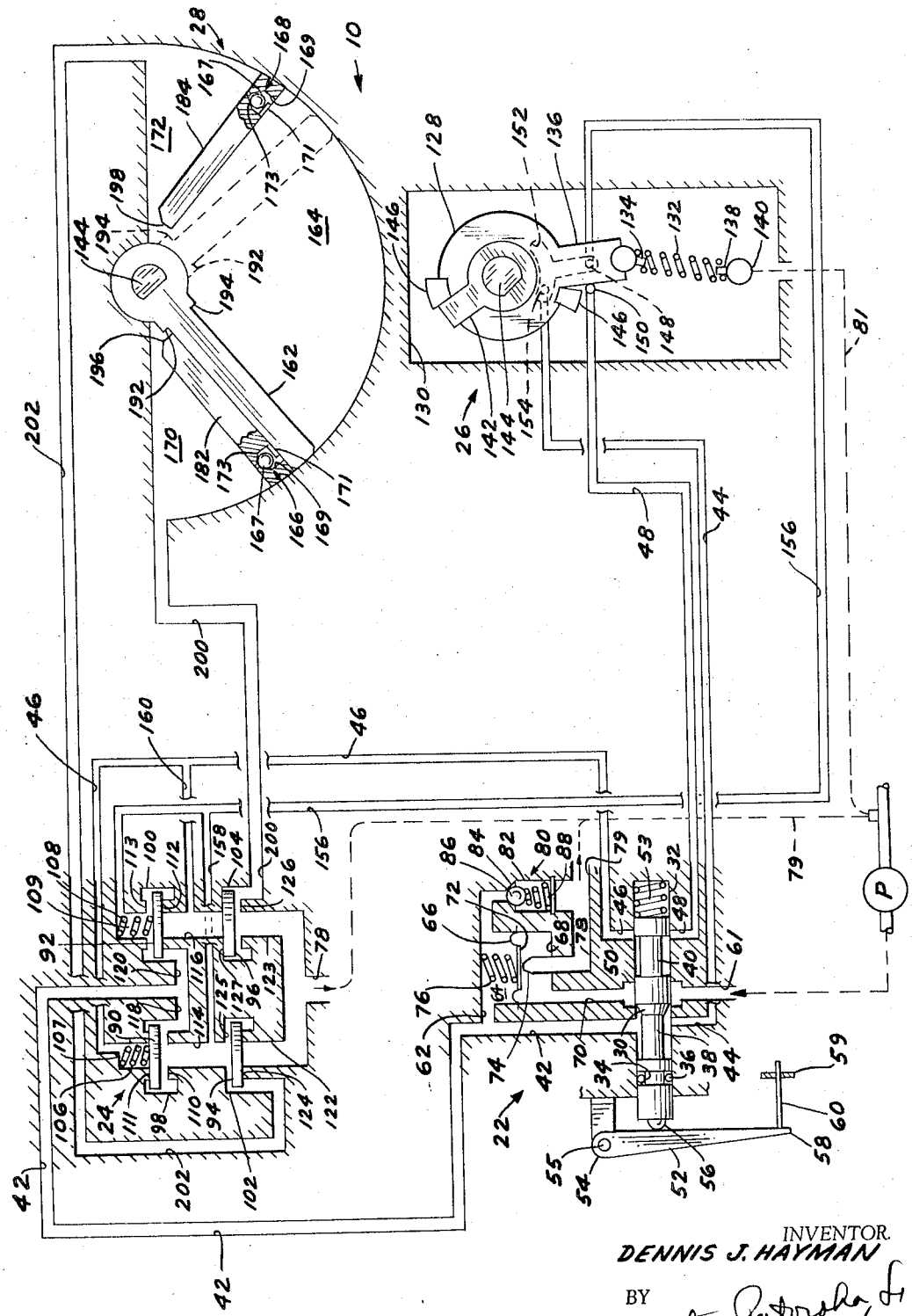

3,296,938
RECIPROCATING HYDRAULIC MOTOR
Dennis J. Hayman, East Detroit, Mich., assignor to Holley Carburetor Company, Warren, Mich., a corporation of Michigan
Filed Dec. 21, 1964, Ser. No. 419,774
10 Claims. (Cl. 91—266)

This invention relates generally to fluid motors, and more particularly to fluid pressure operated motors adapted for actuating vehicle windshield wipers.

The usual hydraulic windshield wiper motors in use or proposed for use today are relatively expensive to manufacture. Many are of the shuttle valve-controlled, oscillating-vane type, and it is essential in such a system that the shuttle valve be held to very close machining tolerances, adding to the expense of the unit.

This invention embodies a novel poppet valve-controlled, oscillating-vane type motor in a compact arrangement which is substantially less expensive than the current conventional units.

Accordingly, a primary object of this invention is to simplify the construction and reduce the cost of manufacture of hydraulic windshield wiper motors.

A more specific object of the invention is to provide a vane-poppet valve reversing motor instead of the more expensive conventional vane-shuttle valve reversing motor.

Another object of the invention is to provide such a hydraulic motor which is both compact and efficient.

Other objects and advantages of the invention will become more apparent when reference is made to the following specification and the accompanying schematic illustration of a fluid motor embodying the invention.

Referring now to the illustration, the fluid motor 10 may be divided into four main groups, as follows: the control valve group 22, the reversing valve group 24, the reversing pilot valve group 26 and the vane motor group 28, each of which will hereinafter be described separately, it being understood that these groups may be contained in a suitable housing having the various chambers and passages formed therein.

Control valve group

The control valve group 22 includes a speed selector spool valve 30 slidably located within a cylindrical passageway 32, the spool valve 30 containing a groove 34 suitable for insertion of an "O" ring seal 36 and annuli 38 and 40 which co-operate with passageways 42, 44, 46 and 48 and with a housing annulus 50. A lever 52 pivotally attached at its one end 54 to a pivot pin 55 mounted in the housing abuts against the end 56 of the spool valve 30 at a point intermediate its ends 54 and 58, while the latter free end 58 is moved through suitable linkage 60 by a conventional control knob or slide (not shown) located on the dashboard 59 of the vehicle employing the invention. An inlet passageway 61 supplies high pressure fluid from any suitable hydraulic pump P, such as the pump for the vehicle power steering system.

The passageway 42 and branch passageway 62 communicate between the annulus 38 and a chamber 64. A diaphragm 66 forms a movable wall between the chamber 64 and another chamber 68, and a passageway 70 communicates between the annulus 50 and the latter chamber 68. A washer 72 fixedly attached to the diaphragm 66 serves as a valve which is urged toward a valve seat 74 by a spring 76 in the chamber 64. The valve seat may encompass an inlet to a conduit 78 which returns fluid via an outlet 79 to the inlet side of the hydraulic pump.

A bleed (not shown) may communicate between the chamber 64 and the return conduit 78 for "shut-down" movement of the diaphragm 66; however, normal leakage may eliminate the need for such a bleed. A relief valve 80 may be included in the control valve section 22 in order to prevent the pressure in the chamber 64 from exceeding some predetermined maximum value. For example, the relief valve may be located in passageway 82 leading from the chamber 64 and may comprise a ball check valve 84 which is urged against a valve seat 86 by a spring 88. The passageway 82 may either intersect a return passage such as the passageway 78, or it may communicate directly with the inlet side of the previously described hydraulic pump.

Reversing valve group

The reversing valve group 24 includes two pairs of poppet type valves 90, 92, 94 and 96 confined within four chambers 98, 100, 102 and 104, respectively. Two of the valves 90 and 92 are urged by springs 106 and 108, confined within chambers 107 and 109, respectively, toward valve seats 110 and 112 and away from oppositely disposed valve seats 111 and 113. A passageway 114 communicates between the chambers 98 and 102, and a second similar passageway 116 communicates between the other two chambers 100 and 104. The passageway 42 communicates between the annulus 38 in the control valve group 22 and branch passageways 118 and 120, which in turn communicate with the chambers 98 and 100, respectively. The passageways 122 and 123 communicate between chambers 102 and 104, respectively, and the conduit 78 returning to the above mentioned power steering or other suitable pump. Poppet valve 94 is seated upon one of the oppositely disposed valve seats 124 and 125, while valve 96 is seated upon one of the seats 126 and 127, depending upon the pressures being transmitted to the passageways 114 and 116 via the passageways 158/156 and 160/46, respectively, as will be explained later.

Reversing pilot valve group

The group 26 comprises a reversing pilot valve 128 located in a chamber 130, which may be connected with low pressure fluid via the return passageway 81. The valve 128 is of the snap-action or "over-center" type, there being a spring 132 pivotally attached at its one end 134 to an extension 136 of the valve 128 and at its other end 138 to a fixed member 140.

An actuating arm 142, fixedly attached to a motor shaft 144, at times abuts against one of two lugs 146 formed on the pilot valve 128, causing the valve 128, which may be pivoted on shaft 144, to begin to rotate to a point whereat it is snapped past the center line by the now compressed spring 132. The extension 136 may thus be moved from a position of covering a port 148 to a position wherein it covers a second port 150, thereby leaving the first port 148 exposed to the low pressure fluid in the chamber 130, and vice versa.

A T-shaped recess 152 on a face of the valve 128 aligns with either the port 150 (passage 48) or the port 148 (passage 156), depending upon the position of the valve extension 136, and communicates at all times with an opening 154 in the chamber 130. A passageway 156 communicates between port 148 and the chamber 100 of the reversing valve group 24, with a branch passageway 158 communicating between the passageway 156 and the passageway 114. The previously mentioned passageway 48 communicates between the port 150 and the annulus 40 of the spool valve 30 in the control valve group chamber or cavity 32. The passageway 46 communicates between the same annulus 40 and the chamber 98 of the reversing valve group 24, and a branch passageway 160 communicates between the passageway 46 and the passageway 116. The passageway 44 communicates high pressure fluid to the opening 154 and the recess 152 from the annulus 38 of the spool valve 30, the annulus 38 having received such fluid from the inlet passageway 61 via the annulus 50.

Vane motor group

The vane motor group 28 comprises a vane 162 movable within the chamber 164 and fixed on the motor shaft 144 so as to rotate the shaft as the vane moves. A pair of check valves 166 and 168 permit alternate communication between the chambers 170 and 172 and the chamber 164 formed by radially extending ribs 182 and 184. Each of the check valves 166 and 168 may consist of a ball 167 retained in a passage 169 by a pin 171, the passage being tapered to provide a seat 173 for the ball valve. The operation of the valves 166 and 168 will be described later.

Shoulders 192 and 194 on the vane 162 serve to co-operate with the ends 196 and 198 of the ribs 182 and 184 in a manner which will be described later. Passageway 200 and 202 communicate between the chambers 170 and 172 of the vane motor group 28 and the chambers 104 and 102 of the reversing valve group 24, respectively.

The shaft 144 may be rotatably mounted in suitable bearings and may extend through the wall of the housing, the external free end thereof being formed for attachment thereto of a member to which a windshield wiper blade may be fixedly attached. A resilient member may be inserted between the bearing and the reversing pilot valve 128 to allow for assembly alignment.

OPERATION

As the prelude to the detailed operation, the general over-all operation of the device will first be described. In the positions illustrated in the drawings, high pressure fluid entering through the passageway 61 is transmitted by the control valve group 22 via the annuli 50 and 38, the passageways 42, 118 and 114, around the outside edge of the poppet valve 94 of the reversing valve group 24 and thence via the passage 202 to the vane motor chamber 172. This high pressure fluid then flows through the check valve 168 and around the edge 198 into the chamber 164, thereby causing the vane 162 and its associated shaft 144 to rotate in a clockwise direction.

The pilot valve actuating arm 142, fixedly attached to and rotated by the shaft 144, abuts against a surface 146 of the pilot valve 128, causing it also to rotate in a clockwise direction. The snap-action spring 132 then serves to move the pilot valve extension 136 past center, resulting in a transition from high pressure to low pressure fluid and low pressure to high pressure fluid in the various conduits leading from the reversing pilot valve assembly 26 to the poppet valves 90, 92, 94 and 96 of the reversing valve assembly 24. This reverses the positions of the poppet valves 90, 92, 94 and 96, thereby diverting the flow of high pressure fluid from the passageways 118 and 114 to the passageways 120 and 116, and thence around the outside edge of the poppet valve 96 to the passageway 200 and the chamber 170 of the vane motor assembly 28. This fluid then flows through the check valve 166 and around the edge 196 into the chamber 164, thereby reversing the movement of the vane 162 from a clockwise to a counterclockwise direction. Since the windshield wiper blade is attached to the end of the shaft 144, the blade, of course, will rotate and reverse in accordance with the movement of the vane 162.

Now, for a more detailed description of the operation of the invention, it will be remembered that the control valve group 22 is actuated by the lever 52, the lever in turn being actuated in any suitable manner by a conventional control knob usually located on the dashboard 59 of the vehicle. The lever 52, when pivoted counterclockwise about the pin 55, contacts the speed selection spool valve 30 moving it to the right within the passage 32. At this time, the annulus 38 is in continual communication with passageways 42 and 44, the annulus 50 is partially opened to annulus 38, and the annulus 40 provides communication between passageways 46 and 48.

It is apparent that a pressure drop would occur between the annuli 38 and 50, so long as there is flow therebetween. Since the flow is from annulus 50 to annulus 38, the pressure in the chamber 68 is higher than that in chamber 64. The lower pressure in the chamber 64 is, of course, supplemented by the force of the spring 76 against the diaphragm 66 to prevent the incoming flow into the chamber 68 from taking the path of least resistance and dumping back to the pump through the conduit 78. Thus, because of the spring 76, the relationship between the diaphragm washer 72 and the outlet opening 74 is such that a pressure drop occurs thereacross, resulting in some back pressure being built up in the passageway 70. As a result of this resistance to the flow through the passageway 70, flow will occur across the opening between the annuli 50 and 38 into the passageway 42.

Should the pressure in the passage 42 increase, such as would occur, for example, if the wiper blade (not shown) were operated on a dry windshield, the pressure in the chamber 64 would likewise increase. This would move the diaphragm 66 downwardly, restricting the size of the outlet opening 72/74, thereby causing a rise in the input pressure in the chamber and passage. This increased pressure in the chamber 68 will move the diaphragm 66 upwardly until a balanced condition across the diaphragm 66 is once again attained.

A constant pressure differential across the opening 50/38 is maintained at all times, so long as the spool valve 30 remains in a fixed position. For a fixed orifice opening 50/38 and a constant pressure differential across the opening 50/38, a fixed flow rate in the passageway 42 would be maintained. Should the pressure in the passageway 42 decrease for any reason, the reverse diaphragm 66 movement would momentarily occur until the total pressures on the two sides of the diaphragm 66 once again became balanced.

As previously mentioned, a relief valve 80 may be included in the control valve section 22 in order to prevent the pressure in the chamber 64 and the passageway 42 from exceeding some maximum amount.

The fixed output flow is communicated via the passageway 42 from the control valve section 22 to the reversing valve section 24. This particular flow is also communicated from the control valve section 22 via the passageway 44 to the reversing pilot valve section 26. So long as the valve body 128 is in the position shown, the high pressure flow will be communicated to the passageway 156 through the ports 154 and 148 and the T-shaped passage 152.

The passageway 156 communicates between the reversing pilot valve section 26 and the chamber 100 of the reversing valve section 24. When there is communication between the passageways 44 and 156, the opening 150 is subjected to low pressure fluid by virtue of the reversing pilot valve 128 being confined within a suitable chamber 130 which is filled with low pressure fluid via the return passageway 81. The passageway 48 communicates between the port 150 and the annulus 40 of the control valve assembly 22, and thence with the chamber 98 of the reversing valve section 24 via the passageway 46.

The high pressure fluid entering the chamber 100 from the passageway 156 forces the poppet valve 92 downwardly against the seat 112, aided by the spring 108. This high pressure fluid, which is also transferred into the passageway 114 via the branch passageway 158, forces the poppet valves 90 and 94 against the seats 111 and 124, respectively. The high pressure fluid entering from the passageway 42 and branch passageway 118 thus flows through the restricted opening around the poppet valve 94 into the passageway 202 and thence into the chamber 172 of the vane motor section 28. This fluid in the chamber 172 can flow through both the check valve 168 and the opening 194/198 into the chamber 164, causing the vane 162 and the shaft 144 to be rotated in a clockwise direction.

The low pressure fluid is communicated from the port 150 of the reversing pilot valve section 26 via the passageways 48 and 46 to the chamber 107 adjacent the poppet valve 90 and to the passageway 116 between the poppet valves 92 and 96 via the branch passageway 160.

Since the actuating arm 142 of the reversing pilot valve assembly 26 is fixedly attached to the same shaft 144, as is the vane 162 of the vane motor assembly 28, the above described clockwise movement of the vane 162 will cause the actuating arm 142 to likewise be rotated in a clockwise direction. Upon coming into contact with the face or lug 146 of the pilot valve body 128, the body 128 will be rotated along with the actuating arm 142 until such time as the extension 136 passes the vertical center line, whereupon the compressed spring 132 will flop the extension 136 to the other side of the center line, thereby aligning the T-shaped passage 152 with the port 150 and uncovering the port 148 to the low pressure fluid surrounding the pilot valve body 128.

High pressure fluid is now free to flow from the high pressure passage 44 through the ports 154 and 150 into the passageways 48 and 46 and thence to the chamber 107 and the passageways 160 and 116 of the reversing valve assembly 24, while low pressure fluid is communicated via the passageway 156 to the chamber 109 and the passageways 158 and 114. This flow reverses the positions of the four poppet valves 90, 92, 94 and 96, thus enabling high pressure fluid from the passageway 42 and branch passageway 120 to be communicated to the chamber 170 of the vane motor assembly 28 via the restricted opening around the poppet valve 96 and the passageway 200. The high pressure fluid then flows through both the check valve 166 and the opening 192/196 into the variable volume chamber 164 to move the vane 162 and shaft 144 in a counterclockwise direction. The fluid being thus forced out of the variable volume chamber 164 through the opening 194/198 into the chamber 172 is returned to the pump via the passageways 202, 122 and 78. As the vane 162 approaches the wall 184 between the chambers 164 and 172, the size of the opening 194/198 will be varied by the shoulder 194 as it enters the opening. This will produce a throttling affect which will cushion the vane 162 and, hence, the windshield wiper blade (not shown) fixed to the shaft 144 at the extreme end of their travel.

When it is desired to stop the action of the windshield wiper motor 10, movement of the lever 52 through the conventional dashboard control knob will permit the spool valve 30 to be moved to the left by the spring 53, thereby shutting off the flow from the passageway 48 to the passageway 46, making it impossible for the reversing valve assembly 24 to receive an actuating signal from the pilot valve assembly 26.

From the above discussion, it is apparent that the invention provides a compact, efficient and inexpensive fluid pressure operated motor.

It should also be apparent that the use of the fluid motor mechanism disposed herein is not limited to the actuation of windshield wiper blades; rather, it may be used to control any like member which is to be reciprocated through a limited range.

Although but one embodiment of the invention has been disclosed and described, it is obvious that other modifications of the invention are possible within the scope of the appended claims.

What I claim as my invention is:

1. A reciprocating motion device responsive to fluid under pressure, said device comprising a means for controlling the rate of flow of said fluid, a plurality of chambers, each chamber having valve seats formed on two opposing sides thereof, a valve in each chamber, said valves being alternately seated upon said opposing valve seats, an additional chamber including an oscillating vane therein, means for alternately supplying said fluid to the opposite sides of said oscillating vane depending upon the positions of said valves, and means for reversing the positions of said plurality of valves from one of said valve seats to its opposing valve seat.

2. A reciprocating motion device responsive to fluid under pressure, said device comprising a means for controlling the rate of flow of said fluid, a plurality of chambers, each chamber having valve seats formed on two opposing sides thereof, a poppet valve in each chamber, said poppet valves being alternately seated upon said opposing valve seats, an additional chamber including an oscillating vane therein, means for alternately supplying said fluid to the opposite sides of said oscillating vanes depending upon the positions of said poppet valves, and means for reversing the positions of said plurality of poppet valves from one of said valve seats to its opposing valve seat.

3. A device as described in claim 1, wherein said means for controlling the rate of flow comprises a passageway having an annulus formed therein, a spool valve slidably mounted in said passageway, said spool valve having an annulus formed thereon, said annuli communicating to an extent depending upon the position of said spool valve, a pair of chambers, a pressure responsive device forming a movable wall between said chambers, resilient means in one of said chambers, a second passageway communicating between said first mentioned annulus and said chamber containing said resilient means, a third passageway communicating between said second mentioned annulus and said other chamber, and an outlet in said other chamber, said pressure responsive means forming a variable opening with said outlet.

4. A hydraulic reciprocating motion device responsive to a fluid under pressure, said device comprising a means for controlling the rate of flow of said fluid, a plurality of poppet valves, an oscillating vane, a pair of passageways, each communicating between a pair of poppet valves and one side of said oscillating vane, said poppet valves being adapted to alternatively permit flow of said fluid through said pair of passageways, and hydraulic means for reversing the positions of said plurality of poppet valves.

5. A reciprocating motion device responsive to a fluid under pressure, said device comprising a means for controlling the rate of flow of said fluid, a plurality of poppet valves, an arrangement of valve seats wherein two valve seats cooperate with the two sides of each poppet valve, an oscillating vane, a pair of passageways, each communicating between a pair of poppet valves and one side of said oscillating vane, said poppet valves adapted to alternatively permit flow of said fluid through said pair of passageways, and means for reversing the positions of said plurality of poppet valves.

6. A fluid motor adapted to receive both high and low pressure fluid, said motor comprising a control valve group, a reversing valve group including a plurality of poppet valves, a reversing pilot valve group, a vane motor group, means for communicating high pressure fluid from said control valve group to said reversing valve group and thence alternately to one of two chambers of said vane motor group, means for communicating low pressure fluid from said reversing pilot valve group to said reversing valve group and at times to said control valve group.

7. A fluid motor adapted to receive both high and low pressure fluid, said motor comprising a control valve group, a reversing valve group including two pairs of poppet valves, a reversing pilot valve group, a vane motor group, means for communicating high pressure fluid from said control valve group to one side of one pair of said poppet valves and to two sides of a third poppet valve and thence alternately to one of two chambers of said vane motor group, means for communicating low pressure fluid from said reversing pilot valve group alternately to one side of one of one pair of valves and to opposing sides of said other pair of valves.

8. A hydraulic reciprocating motion device comprising a control valve section, a reversing valve section including two pairs of poppet valves, a first conduit communicating between said control valve section and some one of said pair of poppet valves, a reversing pilot valve section, a second conduit communicating between said control valve section and said reversing pilot valve section, a third conduit communicating between said second conduit and one valve of one of said pairs of poppet valves, a fourth conduit communicating between said third conduit and both of said second pair of poppet valves, a fifth conduit communicating between said reversing pilot valve and one of said other pair of poppet valves, a sixth conduit communicating between said fifth conduit and both of said first mentioned pair of poppet valves, a vane motor section including a pivotable vane and a pair of check valves, and seventh and eighth conduits communicating between said two pairs of poppet valves and said pair of check valves.

9. A hydraulic windshield wiper motor having a source of high pressure fluid, said motor comprising a body including a spool valve having a pair of annuli formed thereon, a lever for manually actuating said spool valve, a pair of chambers having a pressure responsive device forming a movable wall therebetween, an outlet in one of said chambers, said pressure responsive device serving as a valving surface for said outlet, four chambers, each including a poppet type valve and each having valve seats formed on two sides thereof for alternate seating cooperation with one of said poppet valves, a first pair of passageways each communicating between two of said four poppet valves, an inlet in variable communication with one of said annuli depending upon the position of said spool valve as determined by said manually controlled lever, a passageway in continual communication between said annulus and one of said chambers and in alternate communication with said first pair of passageways, three additional chambers separated by two fixed walls each having a check valve therethrough, a second pair of passageways alternately communicating high pressure fluid from said first pair of passageways to two of said three additional chambers and low pressure fluid from said two chambers to said source, a vane fixedly attached to a shaft, said vane being reciprocated within one of said three additional chambers as determined by alternate flow from one of said other two additional chambers through said check valves, an actuating arm fixedly attached to said shaft for reciprocative movement with said vane, a third pair of passageways for alternately supplying high pressure fluid between said annulus and both the outer valve seat of one of two of said four poppet valves and the inner valve seats of two other of said four poppet valves, a snap-action valve for alternating the flow through said third pair of passageways as determined by contact by said actuating arm.

10. A reciprocating motion device responsive to fluid under pressure, said device comprising a means for controlling the rate of flow of said fluid, a plurality of chambers, each chamber having a pair of valve seats formed therein, a valve in each chamber, each of said valves being alternately seated upon said pair of valve seats, an additional chamber including an oscillating vane therein, means for alternately supplying said fluid to the opposite sides of said oscillating vanes depending upon the positions of said valves, and means for reversing the positions of each of said plurality of valves from one of said pair of valve seats to the other of said pair of valve seats.

References Cited by the Examiner

UNITED STATES PATENTS

| | | | |
|---|---|---|---|
| 1,670,667 | 5/1928 | Oishei et al. | 91—266 |
| 2,344,802 | 3/1944 | Crawford et al. | 91—268 |
| 2,462,580 | 2/1949 | Watson | 91—422 |
| 3,100,423 | 8/1963 | D'Alba | 91—310 |

FOREIGN PATENTS 729,138   5/1955   Great Britain.

MARTIN P. SCHWADRON, *Primary Examiner.*

PAUL E. MASLOUSKY, *Examiner.*